United States Patent
Griffin et al.

(10) Patent No.: US 11,360,809 B2
(45) Date of Patent: Jun. 14, 2022

(54) MULTITHREADED PROCESSOR CORE WITH HARDWARE-ASSISTED TASK SCHEDULING

(71) Applicant: Intel Corporation, Santa Clara, CA (US)

(72) Inventors: William Paul Griffin, Portland, OR (US); Joshua Fryman, Corvallis, OR (US); Jason Howard, Portland, OR (US); Sang Phill Park, Hillsboro, OR (US); Robert Pawlowski, Portland, OR (US); Michael Abbott, Hillsboro, OR (US); Scott Cline, Beaverton, OR (US); Samkit Jain, Hillsboro, OR (US); Ankit More, San Francisco, CA (US); Vincent Cave, Hillsboro, OR (US); Fabrizio Petrini, Palo Alto, CA (US); Ivan Ganev, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 16/024,343

(22) Filed: Jun. 29, 2018

(65) Prior Publication Data

US 2020/0004587 A1    Jan. 2, 2020

(51) Int. Cl.
*G06F 9/48*    (2006.01)
*G06F 9/38*    (2018.01)
*G06F 9/30*    (2018.01)

(52) U.S. Cl.
CPC ......... *G06F 9/4881* (2013.01); *G06F 9/3009* (2013.01); *G06F 9/3851* (2013.01); *G06F 9/4856* (2013.01); *G06F 9/30043* (2013.01); *G06F 9/30065* (2013.01)

(58) Field of Classification Search
None
See application file for complete search history.

(56) References Cited

U.S. PATENT DOCUMENTS

| | | | | |
|---|---|---|---|---|
| 8,108,862 | B2* | 1/2012 | Di Gregorio | G06F 9/4881 718/102 |
| 9,038,070 | B2* | 5/2015 | Lippett | G06F 11/0724 718/100 |
| 9,286,106 | B1* | 3/2016 | Huang | G06F 9/4881 |
| 9,396,039 | B1* | 7/2016 | Arguelles | G06F 11/3688 |
| 2005/0015768 | A1* | 1/2005 | Moore | G06F 9/4881 718/102 |

(Continued)

OTHER PUBLICATIONS

European Search Report and Search Opinion, EP App. No. 19177145.0, dated Sep. 18, 2019, 9 pages.

(Continued)

*Primary Examiner* — Abu Zar Ghaffari
(74) *Attorney, Agent, or Firm* — Nicholson De Vos Webster & Elliott LLP

(57) ABSTRACT

Embodiments of apparatuses, methods, and systems for scheduling tasks to hardware threads are described. In an embodiment, a processor includes a multiple hardware threads and a task manager. The task manager is to issue a task to a hardware thread. The task manager includes a hardware task queue to store a descriptor for the task. The descriptor is to include a field to store a value to indicate whether the task is a single task, a collection of iterative tasks, and a linked list of tasks.

18 Claims, 8 Drawing Sheets

(56) References Cited

U.S. PATENT DOCUMENTS

| | | | | |
|---|---|---|---|---|
| 2005/0165881 | A1* | 7/2005 | Brooks | G06F 9/5027 709/200 |
| 2007/0113231 | A1* | 5/2007 | Honmura | G06F 9/4881 718/100 |
| 2009/0248920 | A1* | 10/2009 | Chaudhuri | G06F 9/3879 710/52 |
| 2010/0082945 | A1* | 4/2010 | Adachi | G06F 9/3005 712/200 |
| 2011/0055838 | A1* | 3/2011 | Moyes | G06F 9/4881 718/102 |
| 2012/0284720 | A1* | 11/2012 | Cain, III | G06F 9/4881 718/101 |
| 2014/0331231 | A1* | 11/2014 | Scheuermann | G06F 9/52 718/102 |
| 2015/0127927 | A1* | 5/2015 | Paddon | G06F 9/3851 712/225 |
| 2015/0331716 | A1* | 11/2015 | Brown | G06F 9/4881 718/103 |
| 2016/0098306 | A1* | 4/2016 | Chang | G06F 9/546 719/314 |
| 2016/0103709 | A1* | 4/2016 | Zhang | G06F 9/50 718/103 |
| 2016/0302999 | A1* | 10/2016 | El-Haddad | A61J 15/0042 |
| 2017/0329632 | A1* | 11/2017 | Ma | G06F 9/4881 |
| 2017/0351555 | A1* | 12/2017 | Coffin | G06F 9/5016 |
| 2018/0225242 | A1* | 8/2018 | Pirotti | G06F 11/2007 |
| 2018/0276046 | A1* | 9/2018 | Joao | G06F 11/3024 |
| 2019/0026169 | A1* | 1/2019 | Chung | G06F 9/546 |
| 2019/0303165 | A1* | 10/2019 | Brewer | G06F 9/485 |
| 2019/0340014 | A1* | 11/2019 | Fishel | G06N 3/08 |
| 2019/0340491 | A1* | 11/2019 | Norden | G06N 3/063 |
| 2019/0347125 | A1* | 11/2019 | Sankaran | G06F 9/383 |

OTHER PUBLICATIONS

Jeffery et al., "A scalable architecture for ordered parallelism", Proceedings of the 48th International Symposium on Microarchitecture, MICRO-48, 2015, pp. 228-241.

Jeffery et al., "Unlocking Ordered Parallelism with the Swarm Architecture", IEEE MICRO, vol. 36, No. 3, 2016, pp. 105-117.

Sanchez et al., "Flexible architectural support for fine-grain scheduling", Electrical Engineering Department, Stanford University, ACM Sigplan Notices, vol. 45, No. 3, 2010, pp. 311-322.

Office Action, EP App. No. 19177145.0, dated Jan. 4, 2022, 11 pages.

* cited by examiner

US 11,360,809 B2

MULTITHREADED PROCESSOR CORE WITH HARDWARE-ASSISTED TASK SCHEDULING

STATEMENT REGARDING FEDERALLY SPONSORED RESEARCH AND DEVELOPMENT

This invention was made with Government support under contract number HR0011-17-3-004 awarded by the Department of Defense. The Government has certain rights in this invention.

FIELD OF INVENTION

The field of invention relates generally to computer architecture, and, more specifically, but without limitation, to processor core design.

BACKGROUND

The performance of a computer system may depend on the suitability of the processor architecture for the applications to be executed. For example, a single instruction single data (SISD) architecture may be appropriate for general purpose computing whereas a single instruction multiple data (SIMD) architecture may be more appropriate for processing of media data.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, as used in descriptions of embodiments of the invention, a "/" character between terms may mean that an embodiment may include or be implemented using, with, and/or according to the first term and/or the second term (and/or any other additional terms).

As discussed in the background section, performance of a computer system may depend on the suitability of the processor architecture for the applications to be executed. The use of embodiments of the present invention may be desired for graph applications and other execution flows that are divergent and/or chaotic, as opposed to bulk synchronous parallel flows.

Figure 1:
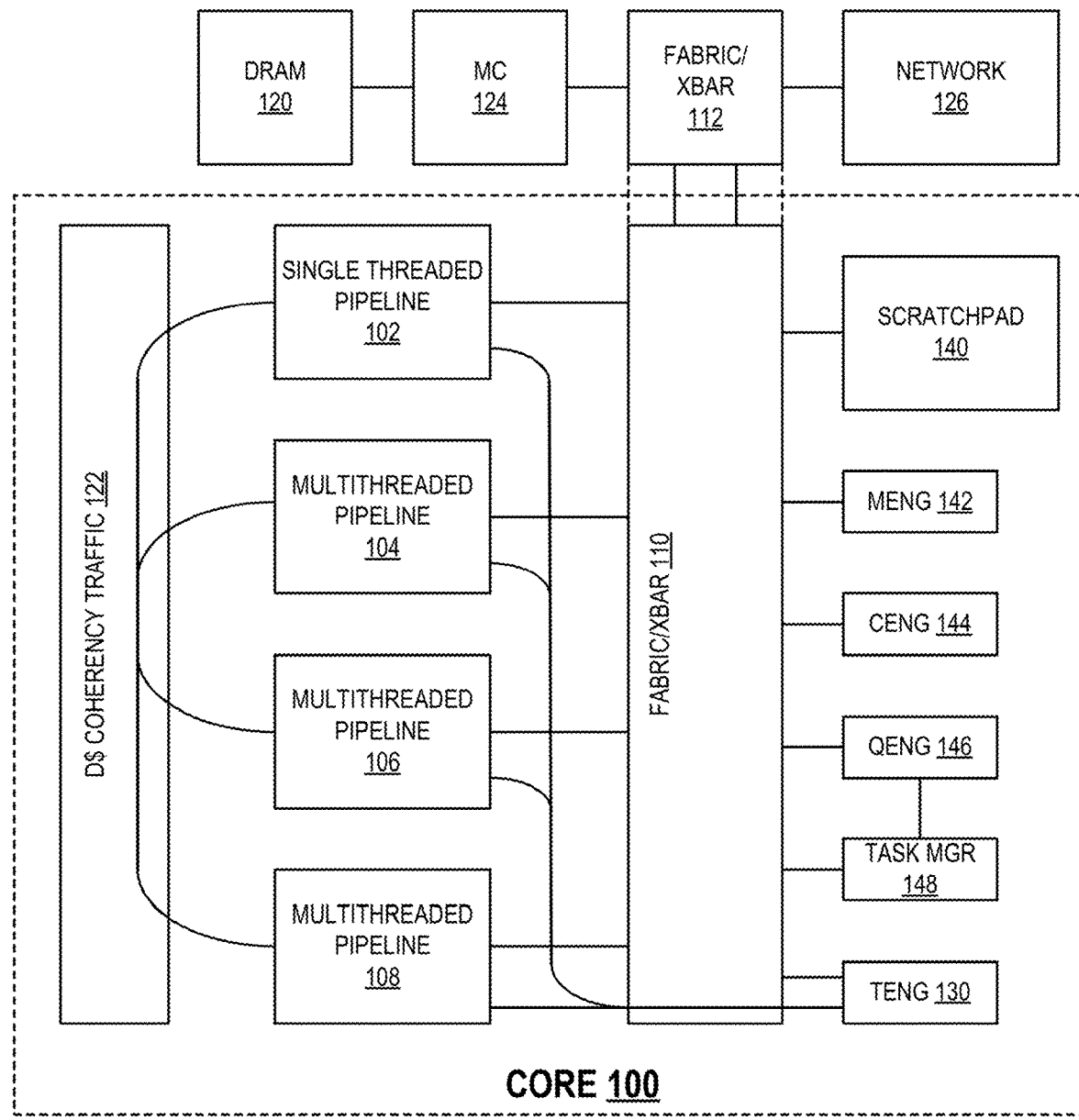
FIG. 1 is a diagram illustrating a processor core according to an embodiment of the invention.

FIG. 1 is a diagram illustrating a processor core according to an embodiment of the invention. Core 100 in FIG. 1 may be implemented in logic gates and/or any other type of circuitry, all or parts of which may be included in a discrete component and/or integrated into the circuitry of a processing device or any other apparatus in a computer or other information processing system. For example, core 100 in FIG. 1 may correspond to or be included in any of processors 510 and 515 in FIG. 5, processors 670 and 680 in FIGS. 6 and 7, and/or cores 802A to 802N in FIG. 8, each as described below.

Core 100 includes single-threaded pipeline 102 and multithreaded pipelines 104, 106, and 108. Although core 100 shows one single-threaded pipeline and three multithreaded pipelines, a core according to an embodiment of the invention may include two or more single-threaded pipelines and no multithreaded pipelines, any number of multithreaded pipelines and no single-threaded pipelines, or any number of single-threaded pipelines and any number of multithreaded pipelines. In embodiments, each pipeline may be constructed of a small number of states, compared to a complex SIMD architecture. Pipelines 102, 104, 106, and 108 are interconnected through an on-core fabric, cross-bar, or other interconnect 110, which may be connected to an off-core fabric, cross-bar or other interconnect 112, such that pipelines 102, 104, 106, and 108 share a common path to system memory 120 and have a single, coherent view of system memory, including data cache traffic as illustrated in block 122. DRAM 120 may be connected to off-core fabric 112 through memory controller 124. Off-core fabric 112 may also connect core 100 to a network 126.

Core 100 may also include thread engine 130 to allocate and de-allocate hardware resources of pipelines 102, 104, 106, and 108. The instruction set architecture (ISA) of each of pipelines 102, 104, 106, and 108 is the same or compatible. Therefore, thread engine 130 may assign any thread to any pipeline and may switch any thread from any pipeline to any other pipeline. Thread engine 130 may perform thread assignment and/or switching to improve performance of any one or more threads, improve overall performance, reduce power consumption, or for any other reason.

Core 100 may also include scratchpad memory 140, memory engine 142, collecting engine 144, query engine 146, and task manager 148. Memory engine 142 may be to manage memory operations, such as direct memory access (DMA), for accelerator, input/output (I/O), and other peripheral devices. Collecting engine 144 may be to manage scatter/gather and/or other data collecting operations. Queue engine 146 may be to manage hardware assistance for queue operations or other stack-like or non-atomic software operations.

Figure 2:
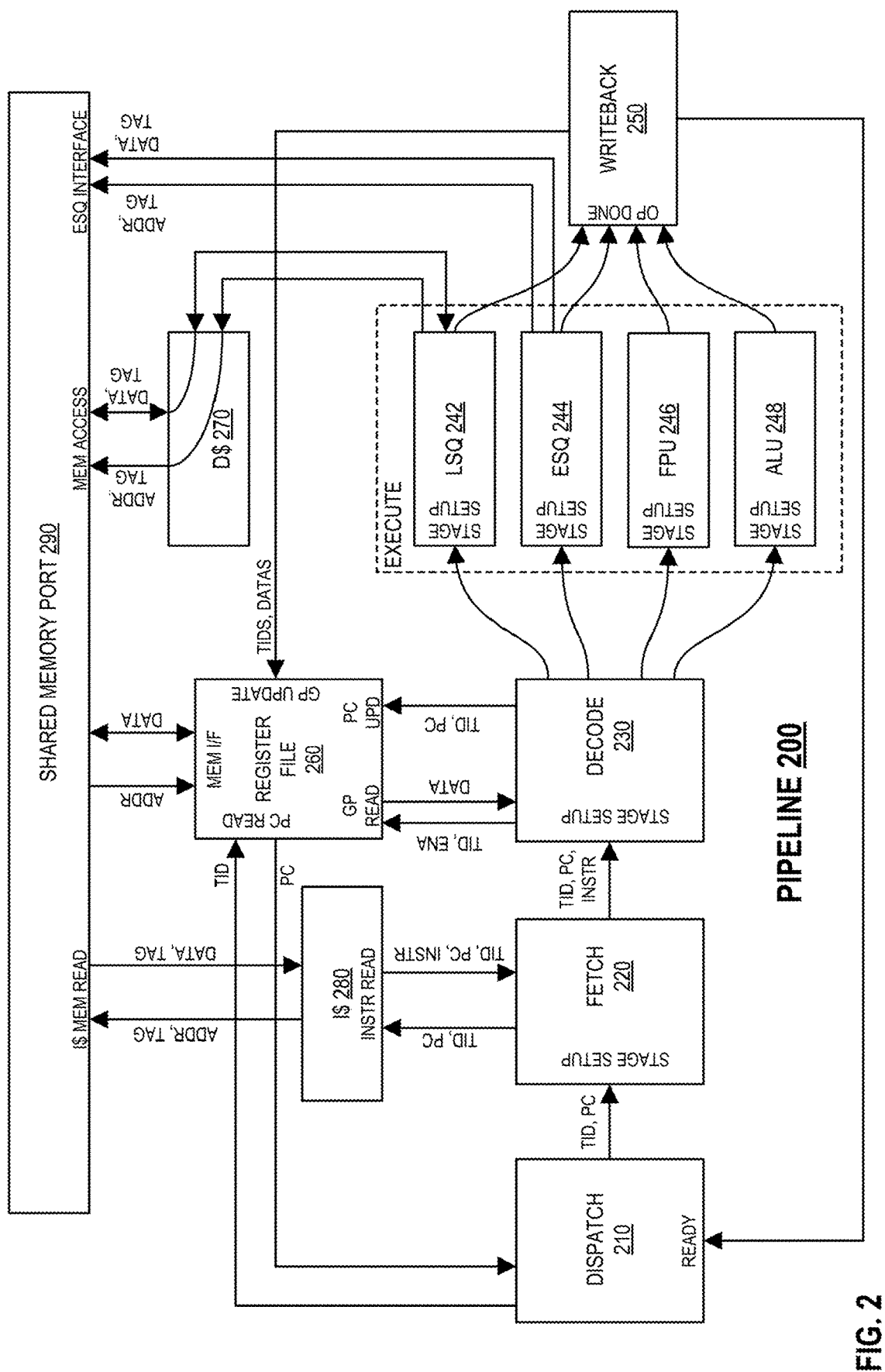
FIG. 2 is a diagram illustrating a multithreaded processor pipeline according to an embodiment of the invention.

FIG. 2 is a diagram illustrating a multithreaded processor pipeline 200 according to an embodiment of the invention. Pipeline 200 may correspond to any of pipelines 104, 106, and 108 of FIG. 1. In embodiments, pipeline 200 may be a simple in-order pipeline including only five stages: dispatch (including dispatcher 210), fetch (including fetch hardware 220), decode (including decoder 230), execute (including load/store queue 242, engine sequencing queue 244, floating-point unit 246, and arithmetic-logic unit 248), and writeback (including writeback hardware 250). It may be implemented without data-dependency tracking, branch prediction, retire reordering, and/or load/store queue ordering by restricting each thread to having only one instruction/operation outstanding at a time. For example, dispatcher 210 may retrieve a thread identifier and a program counter to pass through the pipeline with an instruction/operation of a given thread, then, at register commit in the writeback stage, dispatcher 210 is notified that another instruction/operation for the given thread may be dispatched.

Pipeline 200 includes register file 260 such that each of pipelines 102, 104, 106, and 108 has its own independent register file to support multiple hardware threads per pipeline. Thread engine 130 may schedule threads at the core level instead of at a pipeline level, with no required affinities, such that new threads may be scheduled on any pipeline regardless of whether they are generated from outside the core or within a pipeline. Thread scheduling may be based on a series of heuristics to optimize placement of threads onto pipeline based on any desired metric. For example, for improved performance, threads may be distributed across pipelines, or for power reduction, threads may be targeted to an active pipeline instead of waking an inactive pipeline. Thread engine 130 may also recognize one or more conditions under which migration of a thread is favorable, pause the thread, copy the thread state to another pipeline, kill the old thread, and restart it as a new thread on the other pipeline.

Pipeline 200 also includes instruction cache 270, data cache 280, and shared memory port 290. Threads of applications, such as graph applications, with data access patterns for which the benefits of caching are limited may frequently access off-core memory structures (e.g., through shared memory port 290) and spend significant amounts of time waiting for memory traffic. In various embodiments of the invention, the number of single-threaded pipelines per core, the number of multithreaded pipelines per core, and the number of hardware threads per multithreaded pipeline may be chosen to provide hardware resources for a high level of interleaving between threads to saturate memory bandwidth and optimize performance for these types of applications.

Figure 3:
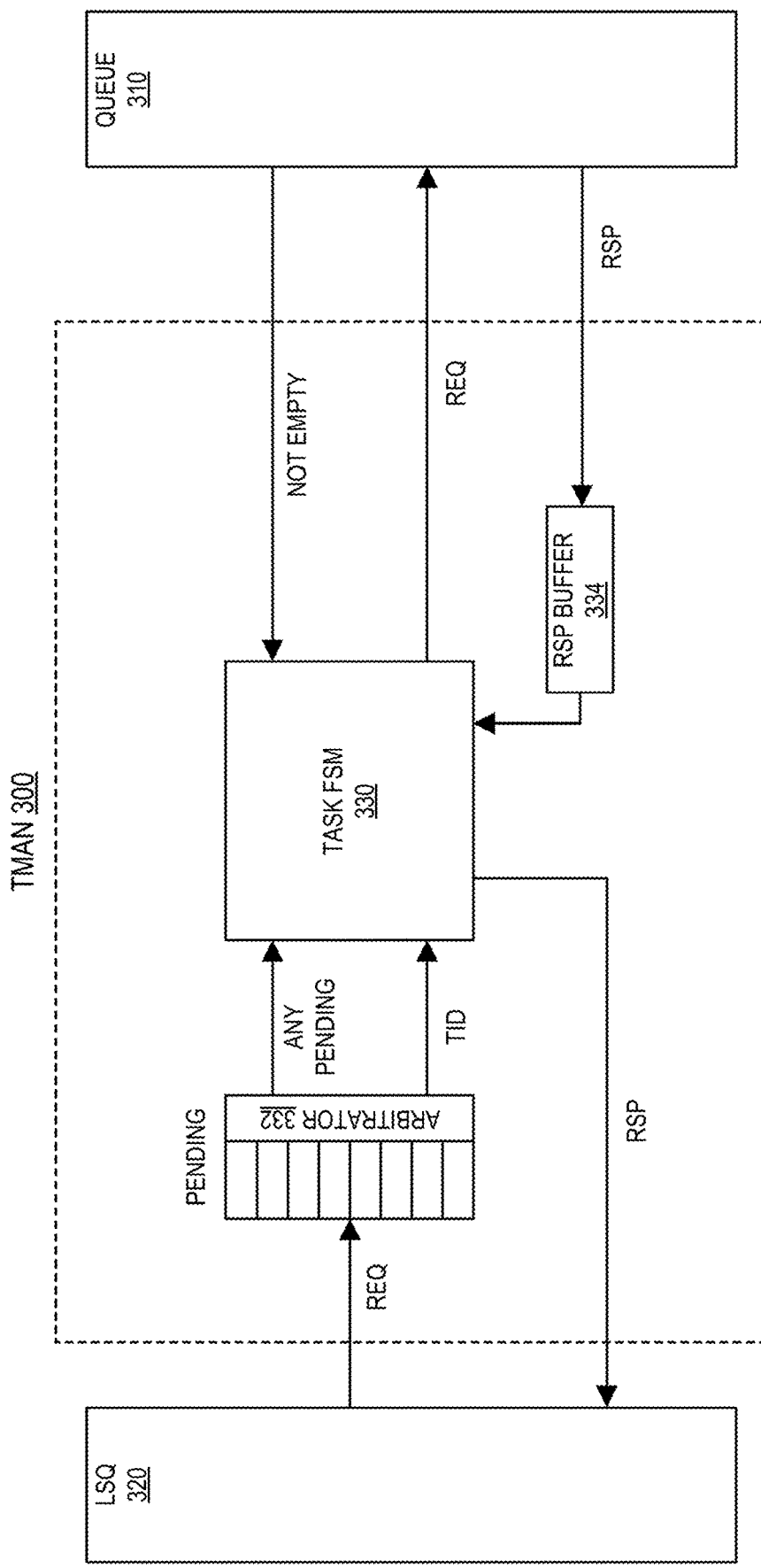
FIG. 3 is a diagram of a task manager according to an embodiment of the invention.

FIG. 3 is a diagram of task manager 300 according to an embodiment of the invention. Task manager 300 may correspond to task manager 148 of FIG. 1. Task manager 300 includes hardware to assist with fine-grained task scheduling and switching according to embodiments of the invention. Embodiments of the invention may be desired to realize the benefits of breaking tasks into smaller, independently-executable chunk Task manager 300 includes a hardware queue, task queue 310, to store task descriptors that represent three different collections of tasks: single tasks, iterative tasks, and linked tasks. As hardware threads on a processor or processor core, such as core 100, complete execution of tasks, they issue read requests to task manager 300. If task manager 300 has been supplied tasks through the task queue 310, it issues a task to the requesting hardware thread. Otherwise, the hardware thread remains in a waiting state until task manager 300 has a task to be assigned.

The use of embodiments of the invention may be desired to provide hardware assistance to task assignment and management. In an embodiment, an iterative task that spawns many tasks may be created with a single addition to task queue 310. In an embodiment, tasks awaiting completion of a given operation may be linked together in a linked list, as a linked task, and added to task queue 310 by a single addition of the head element.

In embodiments, load/store queue 320, which represents a pipeline load/store queue such as load/store queue 242, may request a new thread for its pipeline by issuing a read request to task manager 300. Then, the requesting hardware thread may be blocked and enter a low-power mode until task manager 300 issues a new task to the requesting pipeline. Implementing a new thread request as a read request to task manager 300 allows the requesting pipeline to respond to the new thread more quickly than it would in a software-based approach using an interrupt or polling mechanism.

Task manager 300 includes task finite state machine (FSM) 330, arbitrator 332, and response buffer 334. Arbitrator 332 accepts request for work from multiple hardware threads and holds the requests in a pending queue, buffer, or other storage structure until a new task is ready for each request. For each pending request, FSM 330 examines its internal buffer state to determine if a task descriptor in the response buffer 334 can be used to assign a task to the requesting hardware thread. If no such task exists in the response buffer 334 to fulfill the request, task manager 300 checks the task queue 310 for available task descriptors. Once a task descriptor is available on the task queue 310, FSM 330 copies the task descriptor from the task queue 310 to the response buffer 334 and assigns one task to the requesting hardware thread based on the task descriptor.

Task descriptors may include the fields shown in Table 1.

TABLE 1

| Field | Purpose |
| --- | --- |
| Type [1:0] | single, iterative, linked list |
| stateSz [3:0] | data structure size (number of registers to fill in) |
| iterReg [3:0] | iteration register offset (if data type is iterative) |
| reserved [21:0] | no explicit purpose |
| iterCnt [31:0] | maximum value for the iteration register to reach (unsigned) |

TABLE 1-continued

| Field | Purpose |
|---|---|
| Data/Pointer [63:0] | used either as a pointer or directly as data, depending on Type and stateSz |

In various embodiments, task descriptors may include any of the fields shown in Table 1 and/or any other fields, and each field may be of the size indicated in Table 1 or of any other size.

The value in the type field may indicate that the task is one of three types: single, iterative, and linked list. A descriptor for a single task includes a single value or a pointer to a structure containing multiple values to be used as the task's initial state. When a single task is encountered, it is immediately processed and then disposed of. A descriptor for an iterative task includes a pointer to a structure containing multiple values to be used as a task's initial state, along with an offset to an iteration parameter within the structure and a maximum value to be used as an iteration limit for the iteration parameter. Iterative task descriptors assign tasks with unique iteration parameters to waiting hardware threads until the iteration limit has been reached. A descriptor for a linked list task includes a pointer to a structure containing both the task's internal state and a pointer to the next segment of internal state. Linked list tasks continue, following the list, until a terminating value (e.g., a null pointer) is reached.

Figure 4:
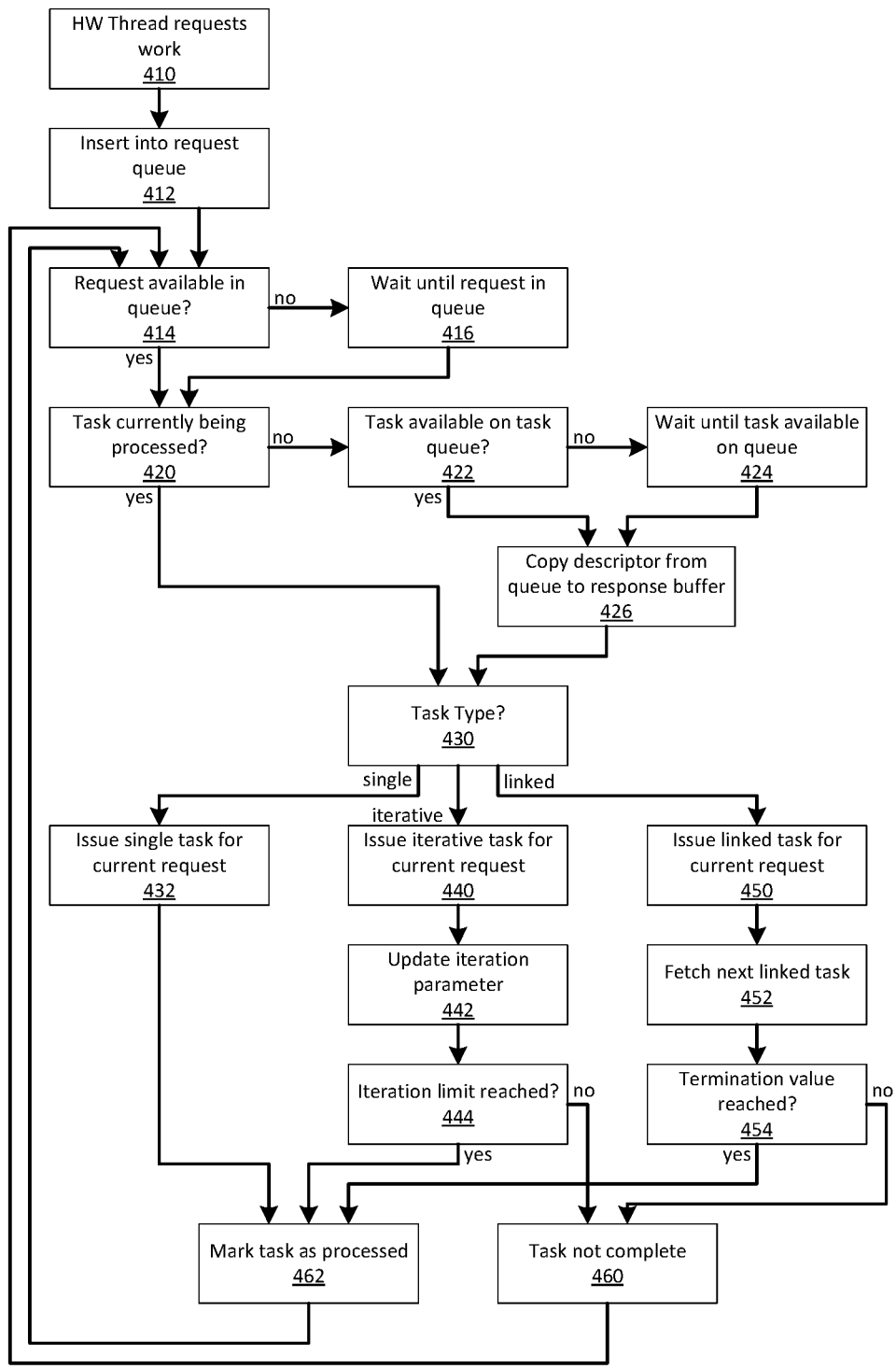
FIG. 4 is a diagram of a method for task management according to an embodiment of the invention.

FIG. 4 is a diagram of a method 400 for task management according to an embodiment of the invention. In embodiments, method 400 may be performed by hardware including, for example, a task manager (e.g., task manager 300 including FSM 330).

In block 410, any ISA-compatible hardware thread in a processor core (e.g., core 100) having single-threaded and/or multithreaded pipelines requests work by issuing a read request from a load/store queue (e.g., load/store queue 242) of its pipeline (e.g., pipeline 200) to a hardware task manager (e.g., task manager 300). In block 412, the request is inserted into a request queue, buffer, or other storage structure.

In block 414, the task manager determines whether a request is available in the request queue. If not, then method 400 continues to block 416, in which the task manager waits until a request becomes available in the request queue. If so, then method 400 continues to block 420, in which the task manager determines whether a task is currently being processed, for example, by checking whether a task descriptor is available in a response buffer (e.g., response buffer 334).

If, in block 420, the task manager determines that no task is currently being processed, then method 400 continues in block 422, in which the task manager determines whether a task descriptor is available on a task queue (e.g., task queue 310). If so, then, method 400 continues in block 426, in which the available task descriptor is copied to the response buffer. If not, then method 400 continues in block 424, in which the task manager and the hardware thread wait until a task becomes available in the task queue, then to block 426. From block 426, method 400 continues to block 430.

If, in block 420, the task manager determines that a task is currently being processed, then method 400 continues in block 430.

In block 430, the task manager determines, based on a value in a type field of the task descriptor, whether the task descriptor represents a single task, a collection of iterative tasks, or a linked list of tasks.

If, in block 430, it is determined that the task descriptor represents a single task, then: in block 432, the task manager issues the single task for the current request, and in block 462, the task manager marks the task as processed.

If, in block 430, it is determined that the task descriptor represents a collection of iterative tasks, then: in block 440, the task manager issues an iterative task for the current request; in block 442, the task manager updates the iteration parameter; and, in block 444, the task manager determines whether the iteration limit has been reached. If so, then in block 462, the task manager marks the task as processed. If not, then in block 460, the task manager recognizes that the task is not complete.

If, in block 430, it is determined that the task descriptor represents a linked list of tasks, then: in block 450, the task manager issues a linked task for the current request; in block 452, the task manager fetches the next linked task; and, in block 454, the task manager determines whether the termination value has been reached. If so, then in block 462, the task manager marks the task as processed. If not, then in block 460, the task manager recognizes that the task is not complete.

From block 460 and/or block 462, method 400 returns to block 414.

Exemplary Computer Systems and Architectures

FIGS. 5-8 are block diagrams of exemplary computer systems and architectures that may include embodiments of the invention. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also include embodiments of the invention. In general, a huge variety of systems or electronic devices capable of incorporating a processor and/or other execution logic as disclosed herein may include embodiments of the invention.

Figure 5:
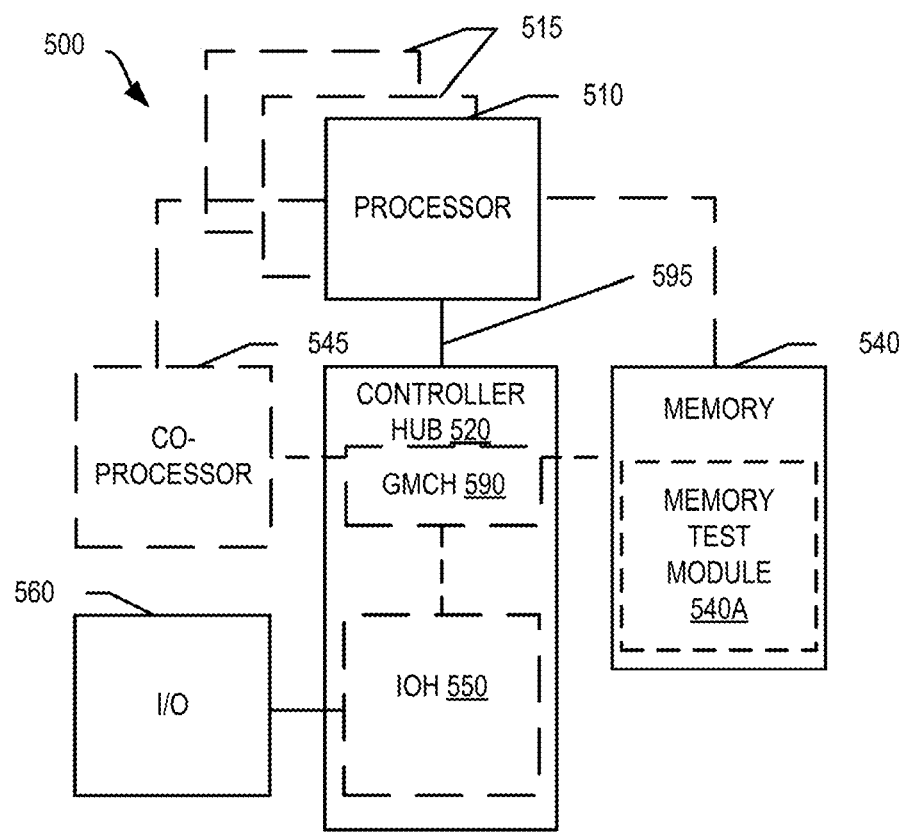
FIG. 5 is a diagram of a system in accordance with one embodiment of the invention.

Referring now to FIG. 5, shown is a block diagram of a system 500 in accordance with one embodiment of the present invention. The system 500 may include one or more processors 510, 515, which are coupled to a controller hub 520. In one embodiment, the controller hub 520 includes a graphics memory controller hub (GMCH) 590 and an Input/Output Hub (IOH) 550 (which may be on separate chips); the GMCH 590 includes memory and graphics controllers to which are coupled memory 540 and a coprocessor 545; the IOH 550 couples input/output (I/O) devices 560 to the GMCH 590. Alternatively, one or both of the memory and graphics controllers are integrated within the processor (as described herein), the memory 540 and the coprocessor 545 are coupled directly to the processor 510, and the controller hub 520 in a single chip with the IOH 550.

The optional nature of additional processors 515 is denoted in FIG. 5 with broken lines. Each processor 510, 515 may include one or more of the processing cores described herein and may be some version of the processor core 100.

The memory 540 may be, for example, dynamic random-access memory (DRAM), phase change memory (PCM), or a combination of the two. For at least one embodiment, the controller hub 520 communicates with the processor(s) 510, 515 via a multi-drop bus, such as a frontside bus (FSB), point-to-point interface such as QuickPath Interconnect (QPI), or similar connection 595.

In one embodiment, the coprocessor 545 is a special-purpose processor, such as, for example, a high-throughput MIC processor, a network or communication processor, compression engine, graphics processor, GPGPU, embedded processor, or the like. In one embodiment, controller hub 520 may include an integrated graphics accelerator.

There can be a variety of differences between the physical resources 510, 515 in terms of a spectrum of metrics of merit including architectural, microarchitectural, thermal, power consumption characteristics, and the like.

In one embodiment, the processor 510 executes instructions that control data processing operations of a general type. Embedded within the instructions may be coprocessor instructions. The processor 510 recognizes these coprocessor instructions as being of a type that should be executed by the attached coprocessor 545. Accordingly, the processor 510 issues these coprocessor instructions (or control signals representing coprocessor instructions) on a coprocessor bus or other interconnect, to coprocessor 545. Coprocessor(s) 545 accept and execute the received coprocessor instructions.

Figure 6:
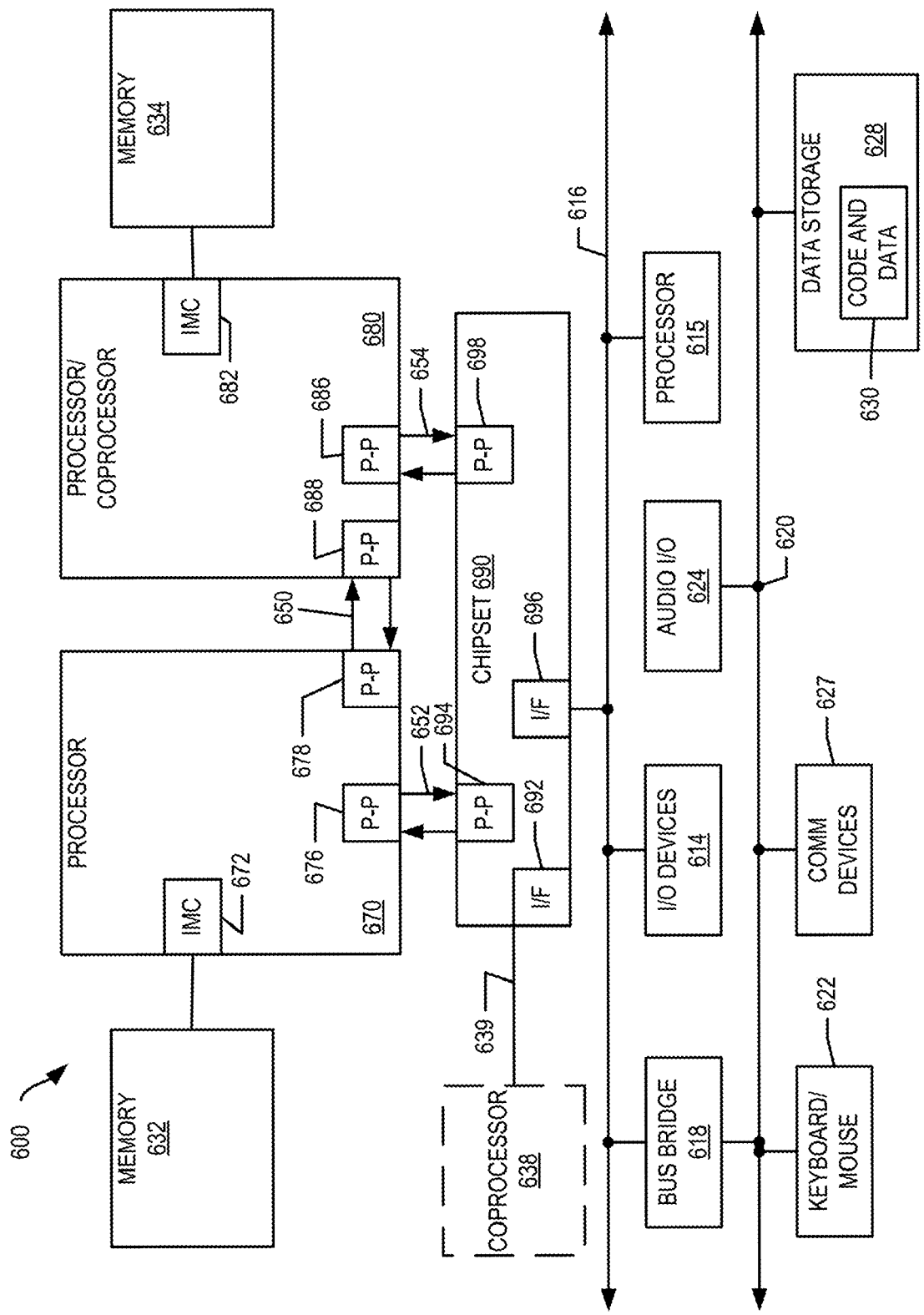
FIG. 6 is a diagram of a first more specific exemplary system in accordance with an embodiment of the invention.

Referring now to FIG. 6, shown is a block diagram of a first more specific exemplary system 600 in accordance with an embodiment of the present invention. As shown in FIG. 6, multiprocessor system 600 is a point-to-point interconnect system, and includes a first processor 670 and a second processor 680 coupled via a point-to-point interconnect 650. Each of processors 670 and 680 may include some version of the processor core 100. In one embodiment of the invention, processors 670 and 680 are respectively processors 510 and 515, while coprocessor 638 is coprocessor 545. In another embodiment, processors 670 and 680 are respectively processor 510 and coprocessor 545.

Processors 670 and 680 are shown including integrated memory controller (IMC) units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may optionally exchange information with the coprocessor 638 via a high-performance interface 692. In one embodiment, the coprocessor 638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present invention is not so limited.

As shown in FIG. 6, various I/O devices 614 may be coupled to first bus 616, along with a bus bridge 618 which couples first bus 616 to a second bus 620. In one embodiment, one or more additional processor(s) 615, such as coprocessors, high-throughput MIC processors, GPGPU's, accelerators (such as, e.g., graphics accelerators or digital signal processing (DSP) units), field programmable gate arrays, or any other processor, are coupled to first bus 616. In one embodiment, second bus 620 may be a low pin count (LPC) bus. Various devices may be coupled to a second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to the second bus 620. Note that other architectures are possible. For example, instead of the point-to-point architecture of FIG. 6, a system may implement a multi-drop bus or other such architecture.

Figure 7:
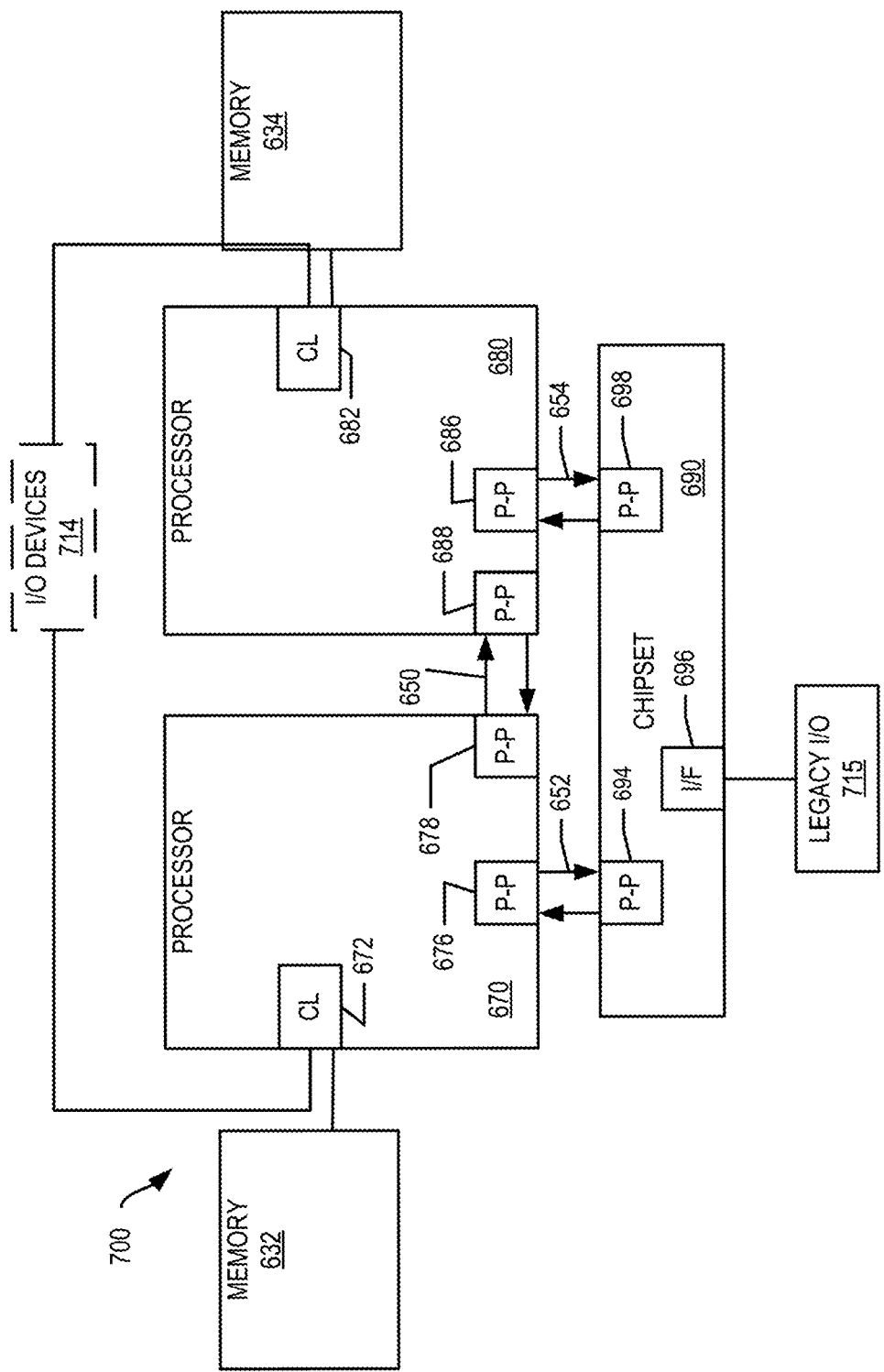
FIG. 7 is a diagram of a second more specific exemplary system in accordance with an embodiment of the invention.

Referring now to FIG. 7, shown is a block diagram of a second more specific exemplary system 700 in accordance with an embodiment of the present invention. Like elements in FIGS. 6 and 7 bear like reference numerals, and certain aspects of FIG. 6 have been omitted from FIG. 7 in order to avoid obscuring other aspects of FIG. 7.

FIG. 7 illustrates that the processors 670, 680 may include integrated memory and I/O control logic ("CL") 672 and 682, respectively. Thus, the CL 672, 682 include integrated memory controller units and include I/O control logic. FIG. 7 illustrates that not only are the memories 632, 634 coupled to the CL 672, 682, but also that I/O devices 714 are also coupled to the control logic 672, 682. Legacy I/O devices 715 are coupled to the chipset 690.

Figure 8:
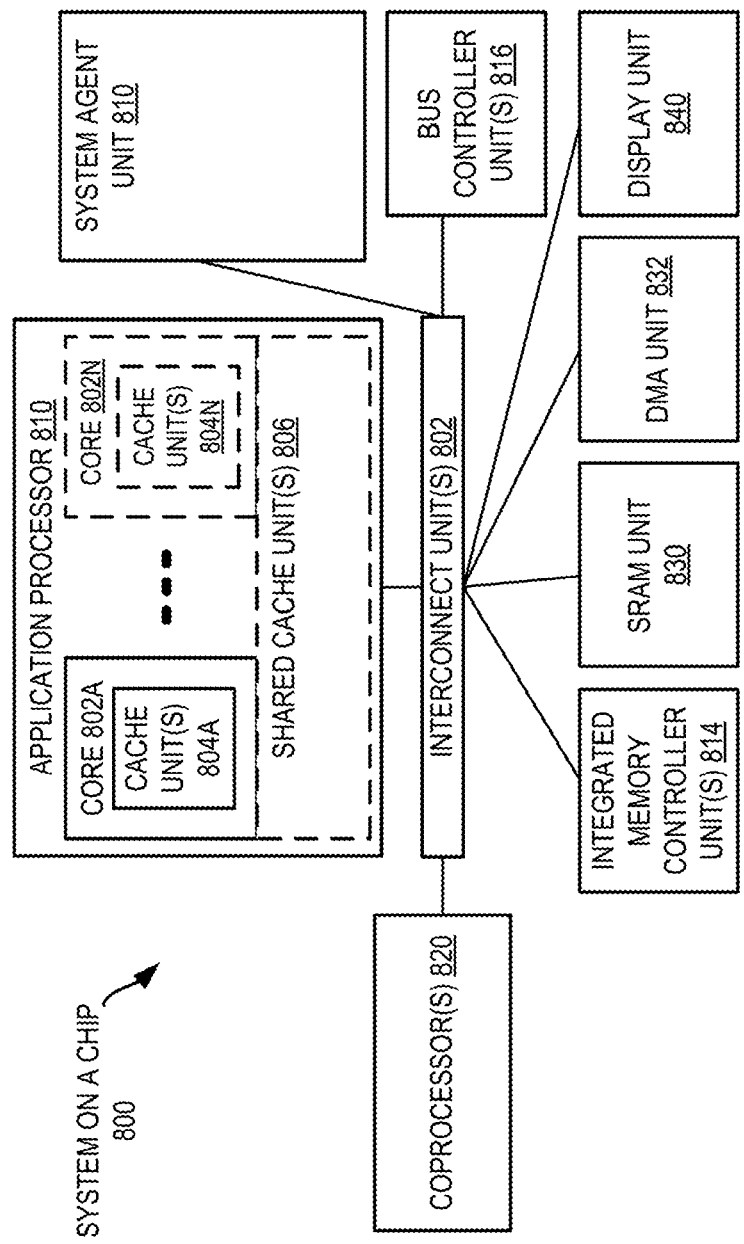
FIG. 8 is a diagram of a system on chip in accordance with an embodiment of the invention.

Referring now to FIG. 8, shown is a block diagram of an SoC 800 in accordance with an embodiment of the present invention. Dashed lined boxes are optional features on more advanced SoCs. In FIG. 8, an interconnect unit(s) 802 is coupled to: an application processor 810 which includes a set of one or more cores 802A-N, which include cache units 804A-N, and shared cache unit(s) 806; a system agent unit 810; a bus controller unit(s) 816; an integrated memory controller unit(s) 814; a set or one or more coprocessors 820 which may include integrated graphics logic, an image processor, an audio processor, and a video processor; an static random access memory (SRAM) unit 830; a direct memory access (DMA) unit 832; and a display unit 840 for coupling to one or more external displays. In one embodiment, the coprocessor(s) 820 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 630 illustrated in FIG. 6, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In an embodiment, a processor includes multiple hardware threads and a task manager. The task manager is to issue a task to a first hardware thread. The task manager includes a hardware task queue in which to store a plurality of task descriptors. Each of the task descriptors is to represent one of a single task, a collection of iterative tasks, and a linked list of tasks.

In various embodiments, any or any combination of the following may also apply. A hardware thread may include a load/store queue to request the task from the task manager by issuing a read request to the task manager. A task descriptor representing a collection of iterative tasks may include a count value to specify a number of iterations. A task descriptor of a linked list of tasks may include a pointer to a head of the linked list of tasks. An instruction set architecture of the first hardware thread and an instruction set architecture of the second hardware thread may be compatible. The processor may also include a thread engine to migrate a software thread from the first hardware thread to a second hardware thread. The thread engine may migrate the software thread based on unequal processing needs, for example, to improve performance of a graph application. The first hardware thread may be in a first single-threaded pipeline and the second hardware thread may be in a second single-threaded pipeline. The first hardware thread and the second hardware thread may be in a single multithreaded pipeline. The first hardware thread may be in a first multi-threaded pipeline and the second hardware thread may be in a second multithreaded pipeline. Only one of the first hardware thread and the second hardware thread may be in a single-threaded pipeline and the other of the first hardware thread and the second hardware thread may be in a multi-threaded pipeline. The single multithreaded pipeline may restrict software threads to one outstanding operation at a time. A task descriptor may represent a single task or multiple tasks. A task descriptor representing multiple tasks (a multi-task descriptor) may represent a collection of iterative tasks, a linked list of tasks, or any other collection, list, or group of tasks.

In an embodiment, a method may include requesting, by a hardware thread of multithreaded processor core, work from a task manager; reading, by the task manager, a task descriptor from a hardware queue; and issuing, by the task manager, a task described by the task descriptor.

In various method embodiments, any or any combination of the following may also apply. The method may also include determining, by the task manager, that no existing task is being processed before reading the task descriptor from the hardware queue. The hardware thread may request work from the task manager by sending, by a load/store queue, a read request to the task manager. The task descriptor may specify that the task is a single task type. The task descriptor may specify that the task is one of a collection of iterative tasks and may specify a count value to indicate a number of iterations. The task descriptor may specify that the task is one of a linked list of tasks and may specify a pointer to a head of the linked list of tasks. A task descriptor may represent a single task or multiple tasks. A task descriptor representing multiple tasks (a multi-task descriptor) may represent a collection of iterative tasks, a linked list of tasks, or any other collection, list, or group of tasks.

In embodiments, an apparatus may include means for performing any of the methods described above. In embodiments, a machine-readable tangible medium may store instructions, which, when executed by a machine, cause the machine to perform any of the methods described above.

In an embodiment, a system may include a processor having multiple hardware threads and a task manager. The task manager is to issue a task to a first hardware thread. The task manager includes a hardware task queue in which to store a plurality of task descriptors. Each of the task descriptors is to represent one of a single task, a collection of iterative tasks, and a linked list of tasks. The system may also include a system memory coupled to the processor, wherein the first hardware thread and the second hardware thread have a coherent view of the system memory.

In system embodiments, as in apparatus and other embodiments, any or any combination of the following may also apply. A hardware thread may include a load/store queue to request the task from the task manager by issuing a read request to the task manager. A task descriptor representing a collection of iterative tasks may include a count value to specify a number of iterations. A task descriptor of a linked list of tasks may include a pointer to a head of the linked list of tasks. An instruction set architecture of the first hardware thread and an instruction set architecture of the second hardware thread may be compatible. The processor may also include a thread engine to migrate a software thread from the first hardware thread to a second hardware thread. The thread engine may migrate the software thread based on unequal processing needs, for example, to improve performance of a graph application. The first hardware thread may be in a first single-threaded pipeline and the second hardware thread may be in a second single-threaded pipeline. The first hardware thread and the second hardware thread may be in a single multithreaded pipeline. The first hardware thread may be in a first multithreaded pipeline and the second hardware thread may be in a second multithreaded pipeline. Only one of the first hardware thread and the second hardware thread may be in a single-threaded pipeline and the other of the first hardware thread and the second hardware thread may be in a multithreaded pipeline. The single multithreaded pipeline may restrict software threads to one outstanding operation at a time. A task descriptor may represent a single task or multiple tasks. A task descriptor representing multiple tasks (a multi-task descriptor) may represent a collection of iterative tasks, a linked list of tasks, or any other collection, list, or group of tasks.

What is claimed is:

1. A processor comprising:
a plurality of hardware threads; and
task manager hardware to issue a new task to a first hardware thread of the plurality of hardware threads;
a hardware task queue to store a descriptor for the new task, the descriptor to include a field to store one of a plurality of values, wherein a first value of the plurality of values is to indicate the new task is a single task, a second value of the plurality of values is to indicate the new task is iterative, and a third value is to indicate the new task is a linked list of tasks; and
a response buffer, wherein the task manager is to check the response buffer for a current task before issuing the new task.

2. The processor of claim 1, wherein the first hardware thread includes a load/store queue to request the new task from the task manager hardware by issuing a read request to the task manager hardware.

3. The processor of claim 1, wherein if the one of the plurality of values indicates the new task is iterative, then the descriptor also includes a count value to specify a number of iterations.

4. The processor of claim 1, wherein if the one of the plurality of values indicates the new task is a linked list of tasks, then the descriptor also includes a pointer to a head of the linked list of tasks.

5. The processor of claim 1, wherein an instruction set architecture of the first hardware thread of the plurality of hardware threads and an instruction set architecture of a second hardware thread of the plurality of hardware threads are compatible.

6. The processor of claim 5, further comprising a thread engine to migrate the new task from the first hardware thread to the second hardware thread.

7. The processor of claim 6, wherein the first hardware thread is in a first single-threaded pipeline and the second hardware thread is in a second single-threaded pipeline.

8. The processor of claim 6, wherein the first hardware thread and the second hardware thread are in a single multithreaded pipeline.

9. The processor of claim 6, wherein the first hardware thread is in a first multithreaded pipeline and the second hardware thread is in a second multithreaded pipeline.

10. The processor of claim 6, wherein only one of the first hardware thread and the second hardware thread is in a single-threaded pipeline and the other of the first hardware thread and the second hardware thread is in a multithreaded pipeline.

11. The processor of claim 8, wherein the single multithreaded pipeline restricts software threads to one operation outstanding at a time.

12. A method comprising:
requesting, by a hardware thread of a multithreaded processor core, a new task from task manager hardware within the multithreaded processor core;
checking, by the task manager hardware, a response buffer within the multithreaded processor core for a current task before issuing the new task;
reading, from a hardware queue within the multithreaded processor core by the task manager hardware, a descriptor for the new task, the descriptor including one of a plurality of values, wherein a first value of the plurality of values is to indicate the new task is a single task, a second value of the plurality of values is to indicate the new task is iterative, and a third value is to indicate the new task is a linked list of tasks; and
issuing, by the task manager hardware, the new task to the hardware thread.

13. The method of claim 12, wherein the hardware thread requests the new task from the task manager hardware by sending, by a load/store queue, a read request to the task manager hardware.

14. The method of claim 12, wherein the descriptor specifies that the new task is a single task type.

15. The method of claim 12, wherein the descriptor:
specifies that the new task is iterative; and
specifies a count value to indicate a number of iterations.

16. The method of claim 12, wherein the descriptor:
specifies that the new task is one of a linked list of tasks; and
specifies a pointer to a head of the linked list of tasks.

17. A system comprising:
a processor including:
a plurality of hardware threads; and
task manager hardware to issue a new task to a first hardware thread of the plurality of hardware threads;
a hardware task queue to store a descriptor for the task, the descriptor to include a field to store one of a plurality of values, wherein a first value of the plurality of values is to indicate the new task is a single task, a second value of the plurality of values is to indicate the new task iterative, and a third value is to indicate the new task is a linked list of tasks; and
a response buffer, wherein the task manager is to check the response buffer for a current task before issuing the new task; and
a system memory coupled to the processor, wherein the first hardware thread and a second hardware thread of the plurality of hardware threads have a coherent view of the system memory.

18. The system of claim 17, wherein the processor is to execute a graph application including a new task; and the processor also includes a thread engine to migrate the new task from the first hardware thread of the plurality of hardware threads to the second hardware thread of the plurality of hardware threads to improve performance of the graph application based on access from the new task to memory.

* * * * *